US006489031B2

(12) United States Patent
Müller et al.

(10) Patent No.: US 6,489,031 B2
(45) Date of Patent: Dec. 3, 2002

(54) SELF-ADHESIVE ADDITION-CROSSLINKING SILICONE COMPOSITIONS

(75) Inventors: Philipp Müller, Burghausen (DE); Georg Eberl, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 2 days.

(21) Appl. No.: 09/821,674

(22) Filed: Mar. 29, 2001

(65) Prior Publication Data

US 2001/0049414 A1 Dec. 6, 2001

(30) Foreign Application Priority Data

Apr. 20, 2000 (DE) .......................... 100 19 599

(51) Int. Cl.⁷ .................... B32B 25/20; C08G 77/04
(52) U.S. Cl. .................. 428/447; 528/15; 528/25; 528/26; 528/31; 528/32; 525/477; 525/476; 427/387; 156/329
(58) Field of Search .................... 528/15, 25, 26, 528/31, 32; 525/477, 478; 428/447; 427/387; 156/329

(56) References Cited

U.S. PATENT DOCUMENTS

| | | |
|---|---|---|
| 4,855,378 A | 8/1989 | Pradl et al. |
| 5,041,481 A | 8/1991 | Sugimori et al. |
| 5,164,461 A | 11/1992 | Mitchell et al. |
| 5,342,913 A * | 8/1994 | Takago et al. ............... 528/15 |
| 5,416,144 A | 5/1995 | Stein et al. |
| 5,487,948 A * | 1/1996 | Stein ........................ 428/447 |
| 5,567,752 A | 10/1996 | Stein et al. |
| 5,595,826 A | 1/1997 | Gray et al. |
| 5,985,371 A * | 11/1999 | Fujioka et al. ............... 427/387 |
| 6,265,518 B1 * | 7/2001 | Krahnke et al. ............... 528/31 |

FOREIGN PATENT DOCUMENTS

| | | |
|---|---|---|
| EP | 0 245 948 A2 | 11/1987 |
| EP | 0 286 387 | 10/1988 |
| EP | 0 295 657 | 12/1988 |
| EP | 0 451 946 A2 | 10/1991 |

OTHER PUBLICATIONS

Machine translation of JP 2000–073041, Kazuhisa, Mar. 2000, obtained from JPO web–site.*
Machine translation of JP 06–192576, Masayuki, Jul. 1994, obtained from JPO web–site.*
Patent Abstracts of Japan, vol. 018, No. 547 (C–1262) Oct. 19, 1994, Corresponding To JP–A 06192576.
Patent Abstracts of Japan, vol. 2000, No. 02, Feb. 29, 2000, Corresponding To JP–A 11323132.
International Search Report—mailed Jul. 19, 2001.

* cited by examiner

Primary Examiner—Robert Dawson
Assistant Examiner—Jeffrey B. Robertson
(74) Attorney, Agent, or Firm—Brooks & Kushman P.C.

(57) ABSTRACT

The invention relates to self-adhesive addition-crosslinking silicone compositions which contain the components (A) diorganopolysiloxanes having aliphatic unsaturation,
(B) organohydrogenpolysiloxanes bearing compatability decreasing substituents,
(C) compounds having at least one aliphatically unsaturated radical and at least one β-diketone function or β-keto ester function and
(D) a hydrosilylation catalyst. The compositions are cost effective, and exhibit excellent adhesion to both metallic and non-metallic substrates while maintaining other desirable physical properties.

18 Claims, No Drawings

SELF-ADHESIVE ADDITION-CROSSLINKING SILICONE COMPOSITIONS

BACKGROUND OF THE INVENTION

1. Field of the Invention

The invention relates to self-adhesive addition-crosslinking silicone compositions and addition-crosslinked silicone elastomers and composite materials prepared therefrom.

2. Background Art

It is known that the adhesion of addition-crosslinked silicone elastomers to numerous substrates, such as plastics, metals and glasses, is poor, i.e. if an addition-crosslinking silicone elastomer material is applied to a substrate and then crosslinked, the silicone elastomer formed can, as a rule, be peeled off the substrate surface without difficulty, for example by applying only small tensile forces. Frequently, spontaneous delamination of silicone elastomers from the substrate may occur. However, since strong and permanent adhesion of the silicone elastomer to the substrate is of decisive importance in numerous applications, a large number of special measures have been proposed for achieving a strong bond between substrates and silicone elastomers.

In principle, the adhesive strength of the silicone elastomer/substrate composite can be increased by suitably changing the chemical and/or physical characteristics of the substrate, or at least its surface, prior to application of the addition-crosslinking silicone elastomer composition. This can be effected, for example, by pretreating the substrate surface with adhesion-promoting additives, so-called primers; by subjecting the substrate surface to plasma treatment; by mixing special additives into the substrate; by selectively adjusting the morphology of the substrate, for example by increasing the surface roughness, etc. These measures have, inter alia, the disadvantage that additional process steps are required or that the characteristics of the substrate have to meet special requirements.

The adhesive strength of the silicone elastomer/substrate composite can also be increased by selectively changing the chemical and/or physical characteristics of the addition-crosslinking silicone elastomer material. Numerous adhesion-promoting additives are known which promote self-adhesion of the resulting silicone elastomer to various substrates when mixed with the uncrosslinked silicone material. These include compounds which contain highly reactive functional groups, such as alkoxy, epoxy, carboxyl, amino, etc., these groups generally being chosen so that the adhesion promoter is capable of reacting both with the substrate and with a silicone elastomer component. Although incorporation of such adhesion promoters may make it possible to dispense with pretreatment of the substrate, the adhesive strength achieved frequently does not meet minimal requirements, in particular where vulcanizing temperatures are limited to less than 100° C., important for some applications. In addition, further increases in adhesive strength by employing higher contents of these adhesion promoters is possible only to a limited extent, since the highly reactive groups borne by the adhesion promoters have an increasingly disadvantageous effect on performance characteristics such as shelf-life, crosslinking characteristics (inhibition), toxicological safety, etc. For these reasons, interest has been focused on keeping the content of adhesion promoters as low as possible.

The adhesion promoters most frequently used for self-adhesive addition-crosslinking silicone elastomers are epoxy-functional silanes such as glycidyloxypropyltrimethoxysilane; or methacrylate-functional silanes such as methacryloxypropyltrimethoxysilane; or vinyl silanes such as vinyltrimethoxysilane, or combinations thereof. The organic functional groups relevant for the buildup of composite strength, however, are too unreactive at temperatures below 100° C. to bring about sufficient adhesion to the substrate. In the case of many important applications of self-adhesive silicone elastomers, the maximum vulcanizing temperature is limited, one example being the encapsulation of electronic circuits. The temperature-sensitive components such as coils, capacitors, and ICs, permit only very limited thermal loads without risking loss of function. Frequently, only brief heating at temperatures from 50° C. to 80° C. is possible.

U.S. Pat. No. 5,164,461 and European published application EP-A-451 946 describe addition-crosslinking silicone elastomers with intrinsic adhesion to the substrates that are contacted during vulcanization. The most common adhesion promoters here are epoxide- and/or methacrylate-functional alkoxysilanes. The vulcanizing temperatures are required to be at least 130° C. Using the maleate- and fumarate-functional alkoxysilane additives claimed in U.S. Pat. No. 5,164,461, self-adhesion is achieved at crosslinking temperatures of at least 100° C.

U.S. Pat. No. 5,595,826 describes adhesion promoters based on reaction products of aliphatically unsaturated monoalcohols or polyalcohols with organofunctional alkoxysilanes such as methacryloxypropyltrimethoxysilane or glycidyloxypropyltrimethoxysilane. Additives of this kind bring about self-adhesion of addition-crosslinking silicone elastomers at vulcanizing temperatures from 70 to 100° C. However, high adhesive strengths are achieved exclusively with metallic and inorganic substrates, for example steel, aluminum, glass and copper.

U.S. Pat. Nos. 5,416,144 and 5,567,752 describe adhesion promoters based on reaction products of amines or aminoalkoxysilanes with methacryloxypropyl- or glycidyloxypropyltrimethoxysilane. With these additives, self-adhesion is achieved at vulcanizing temperatures from 80 to 100° C. A problem in this case is the strong inhibition on the Pt-catalyzed crosslinking reaction caused by amine compounds, as is well known. Furthermore, contact between amine compounds and SiH components constitutes a potential risk, since formation of hydrogen gas must be expected. Moreover, due to the loss of SiH groups, undervulcanization is expected. A further disadvantage of highly polar additives of this kind is severe thixotroping of the siloxane composition and the associated reduction in fluidity.

EP-A-286 387 describes organosilicon compounds with a β-keto ester function. In particular, alkoxysilanes having at least one alkyl-bonded β-keto ester function are described. Numerous applications of such structures are indicated, including applications as constituents of primers for epoxy resin/glass fiber composites. EP-A-295 657 describes metal chelate complexes formed, for example, from titanium and the chelating ligand, trialkoxysilylpropylacetoacetate. Structures of this kind are claimed to be adhesion-promoting additives in epoxy resin formulations.

U.S. Pat. No. 5,041,481 describes adhesion promoters obtained by the reaction of 1,3-diketone compounds with aminoalkylalkoxy silanes. The latter are claimed, inter alia, to be additives in condensation-crosslinking silicone elastomers. It must be noted that all the adhesion-promoting additives described based on 1,3-diketone compounds necessitate complicated reactions with alkoxysilanes for attachment of alkoxysilyl functionality. Disadvantages in this context are that in some cases, highly toxic reactants such as trimethoxysilane are required. Further, owing to keto/enol tautomerism, a difficult reaction regime is created, with numerous secondary reactions such as propene elimination or reduction of the keto group by SiH groups. Distillative purification and isolation of the reaction products are possible only with massive loss of yield, owing to gellation as a result of the reaction of the enol groups of the 1,3-diketone structure with alkoxysilyl groups with elimination of alcohol. Owing to their known effect of strong inhibition of hydrosilylation, adhesion promoters based on amino-functional alkoxysilanes are of only limited usefulness in addition-crosslinking silicone elastomers.

SUMMARY OF THE INVENTION

The present invention pertains to addition crosslinking compositions containing (A), an organopolysiloxane with unsaturated hydrocarbon group functionality; (B), an Si—H functional crosslinker containing compatability decreasing groups; (C), an adhesion promoter containing minimally one aliphatically unsaturated hydrocarbon group and at least one β-diketone or β-ketoester group; and (D) a hydrosilylation catalyst. The particular combination of compatibility-reducing crosslinker (B) and adhesion promoter (C) have a synergistic effect on adhesion. The compositions exhibit excellent adhesion to a variety of substrates without the disadvantages of prior adhesion-promoting additives.

DETAILED DESCRIPTION OF THE PREFERRED EMBODIMENT(S)

The invention thus relates to self-adhesive addition-crosslinking silicone compositions which contain:

(A) a diorganopolysiloxane of the general formula (1)

$$R^1{}_a R^2{}_b SiO_{(4-a-b)/2} \tag{1},$$

in which

R$^1$ is a hydroxyl radical or a monovalent, optionally halogen-substituted C$_{1-20}$ hydrocarbon radical optionally containing O, N, S or P atoms, and free of aliphatically unsaturated groups, R$^2$ is a monovalent, aliphatically unsaturated, optionally halogen-substituted C$_{2-10}$ hydrocarbon radical optionally containing O, N, S or P atoms, and b is on average from 0.003 to 2, with the proviso that 1.5<(a+b)<3.0, that on average at least two aliphatically unsaturated radicals R$^2$ are present per molecule, and that the viscosity of the diorganopolysiloxane (A), determined at 25° C., is 1 mPa·s to 40,000 Pa·s;

(B) an organohydrogenpolysiloxane of the general formula (2)

$$R^3{}_c R^4{}_d R^5{}_e H_f SiO_{(4-c-d-2e-f)/2} \tag{2},$$

in which

R$^3$ is a monovalent aliphatically saturated C$_{1-20}$ hydrocarbon radical, R$^4$ is (a) an optionally halogen-substituted monovalent C$_{6-15}$ hydrocarbon radical which contains at least one aromatic C$_6$-ring, or (b) a halogen-substituted, saturated monovalent C$_{2-20}$ hydrocarbon radical optionally containing O, N, S or P atoms, R$_5$ is a bivalent, optionally halogen-substituted C$_{6-20}$ hydrocarbon radical Si-bonded at both ends, optionally containing O, N, S or P atoms, and c, d, e and f denote positive numbers, with the proviso that the relationship: 0.05<100 (d+e)/(c+d+e+f)<12 is fulfilled and that the viscosity of the organo-hydrogenpolysiloxane (B), determined at 25° C., is 1 mPa·s to 100 Pa·s;

(C) compounds containing at least one aliphatically unsaturated radical and at least one β-diketone or β-keto ester function, of the general formula (3):

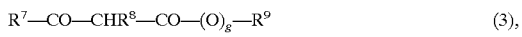

$$R^7—CO—CHR^8—CO—(O)_g—R^9 \tag{3},$$

where

R$^7$ and R$^9$ are each an identical or different, (a) monovalent, aliphatically unsaturated, optionally halogen-substituted C$_{2-12}$ hydrocarbon radical, and optionally containing O, N, S or P atoms, or (b) a monovalent aliphatically saturated C$_{1-20}$ hydrocarbon radical, R$^8$ is hydrogen, (a) a monovalent, aliphatically unsaturated, optionally halogen-substituted C$_{2-12}$ hydrocarbon radical, and optionally containing O, N, S or P atoms, or (b) a monovalent aliphatically saturated C$_{1-20}$ hydrocarbon radical, g is 0 or 1; and (D) a hydrosilylation catalyst.

Organohydrogenpolysiloxane (B) acts as an adhesion promoter and simultaneously as a crosslinking agent.

The advantageous properties of the silicone compositions of the present invention include the fact that the self-adhesion is achieved, in part, by a component required by every addition-crosslinking material, namely the SiH-containing crosslinking agent (B), in combination with the β-diketone-functional or β-keto-ester-functional compound (C), it merely being necessary for the SiH crosslinking agent (B) to contain a few groups which reduce compatibility with the other components of the material, especially with the diorganopolysiloxane. These comparability reducing groups are not reactive functional groups, but are preferably phenyl groups, with the result that the toxicological safety of the material, i.e., drinking water approval, BGA/FDA approval is preserved; no vulcanization problems occur; the shelf-life is sufficient; the transparency of the crosslinked silicone elastomer is maintained; and no components which exude or are extractable are added.

The combination of the SiH crosslinking agent (B) having reduced compatibility, with a β-diketone- or β-keto-ester-functional, and alkenyl-functional compound (C), makes it possible, first, to keep the content of incompatible groups in the SiH crosslinking agent low, and secondly, to achieve the adhesion-promoting activity of the β-diketone- or β-keto-ester-functional and alkenyl-functional compound (C) even when employing SiH crosslinking agents with relatively low SiH functionality. Only the combination of the two components (B) and (C) leads to synergistic self-adhesion effects of these two components.

In particular, the present composition is distinguished by the facts that a) adhesion to a variety of substrates, such as PBT, PA6, PA66, and PPS, as well as steel, aluminum and glass, is achieved at vulcanizing temperatures below 100° C.;

b) the crosslinking rate is only minimally affected;

c) the transparency of the crosslinked silicone elastomers is not impaired;

d) there is no need to accept any disadvantageous changes in the mechanical elastomer properties;

e) the adhesion-promoting component (B) simultaneously acts as a crosslinking agent;

f) the fluidity of the uncrosslinked material is minimally reduced; and g) strong self-adhesion can be achieved even on metals without hindering the deformability from metal vulcanization molds.

In the latter respect, it was found that the adhesion to metal shortly after crosslinking permits demolding of the silicone elastomer part. If, however, the silicone elastomer/metal composite is stored prior to demolding, the silicone elastomer adheres strongly and permanently onto the metal surface within a short time.

Although the adhesion-promoting component (B) of the present invention also has reduced compatibility with the other components of the material, which is evident from turbidity upon admixing, this turbidity disappears completely as soon as the material is heated for the purpose of crosslinking, indicating homogeneous distribution of the molecules of the crosslinking agent in the material at the time of crosslinking.

The second adhesion-promoting constituent, constituent (C) of the present invention, contains a β-diketo function or β-keto ester function. This 1,3-diketone structure is present both in β-diketones and in β-keto esters, such as acetoacetic esters, for example. This 1,3-diketone structure brings about an increase in adhesion at low vulcanizing temperature. Responsibility for this effect is attributed to strong dipolar interactions of the 1,3-diketo function or to hydrogen bonding of the enol form of the additive with polar groups of the substrates. The anchoring of the substrate-interacting β-diketo function into the siloxane network is provided by the aliphatically unsaturated radical, which is amenable to hydrosilylation with the SiH crosslinker. The synergy of the constituents (B) and (C) is believed to reside in the migration behavior of the SiH crosslinker causing an increased concentration of the latter at the siloxane/substrate interface. This migration behavior is believed brought about by the incompatibility of the SiH crosslinker with the siloxane composition, with the result that sufficient SiH crosslinker functionality is present at the laminate interface for the incorporation of the substrate-interacting β-diketo function by hydrosilylative crosslinking, this incorporation by crosslinking believed responsible for the buildup of adhesion.

Each of components (A), (B) and (C) may comprise a single compound or a mixture of different compounds. The terms "a" and "an" mean "one or more" unless indicated to the contrary.

Examples of the radicals $R^1$ are alkyl radicals such as the methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl or bornyl radicals; aryl or aralkyl radicals such as the phenyl, ethylphenyl, tolyl, xylyl, mesityl or naphthyl radicals; aralkyl radicals such as the benzyl, 2-phenylpropyl or phenylethyl radicals; and those derivatives of the above radicals which are halogenated and/or functionalized with organic groups, for example the 3,3,3-trifluoropropyl, 3-iodopropyl, 3-isocyanatopropyl, aminopropyl, methacryloyloxymethyl or cyanoethyl radicals. Preferred radicals $R^1$ contain 1 to 10 carbon atoms and optionally halogen substituents. Particularly preferred radicals $R^1$ are the methyl, phenyl and 3,3,3-trifluoropropyl radicals, in particular the methyl radical.

The radicals $R^2$ are obtainable by a hydrosilylation reaction. Examples of these are alkenyl and alkynyl radicals, such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals, such as the cyclopentenyl, cyclohexenyl, 3-cyclohexenylethyl, 5-bicycloheptenyl, norbornenyl, 4-cyclooctenyl or cyclooctadienyl radicals; alkenylaryl radicals, such as the styryl or styrylethyl radicals; and those derivatives of the above radicals which are halogenated and/or contain heteroatoms, such as the 2-bromovinyl, 3-bromo-1-propynyl, 1-chloro-2-methallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl or methacryloyloxy radicals. Preferred radicals $R^2$ are the vinyl, allyl and 5-hexenyl radical, in particular the vinyl radicals.

In the case of the diorganopolysiloxanes (A) of the general formula (1), the viscosity determined at 25° C. is preferably 100 mPa·s to 30,000 Pa·s. Most preferably, the viscosity range is from 1 to 30,000 Pa·s. Depending on the type of the addition-crosslinking material, different viscosity ranges are particularly preferred. Viscosities from 100 to 10,000 mPa·s are particularly preferred for the materials known as RTV-2 (two-component, room temperature vulcanizing); from 1 to 100 Pa·s for LSR (liquid silicone rubber); and from 2000 to 40,000 Pa·s for HTV (high temperature vulcanizing).

Examples of $R^3$ are alkyl radicals such as the methyl, ethyl, propyl, isopropyl, tert-butyl, n-octyl, 2-ethylhexyl or octadecyl radicals, and cycloalkyl radicals such as the cyclopentyl, cyclohexyl, norbornyl or bornyl radicals. Preferred radicals $R^3$ are hydrocarbon radicals having 1 to 10 carbon atoms. A particularly preferred radical $R^3$ is the methyl radical.

Examples of radicals $R^4$ (a) are the phenyl, tolyl, xylyl, biphenylyl, anthryl, indenyl, phenanthryl, naphthyl, benzyl, phenylethyl or phenylpropyl radical, and those derivatives of the above radicals which are halogenated and functionalized with organic groups, such as o-, m- or p-chlorophenyl, pentafluorophenyl, bromotolyl, trifluorotolyl, phenoxy, benzyloxy, benzyloxyethyl, benzoyl, benzoyloxy, p-tert-butylphenoxypropyl, 4-nitrophenyl, quinolinyl or pentafluorobenzoyloxy radicals.

Examples of hydrocarbon radicals $R^4$ (b) having 2 to 20 carbon atoms are the 3-chloropropyl, 3-bromopropyl, 3,3,3-trifluoropropyl, 2-fluoroethyl, 1,1-dihydroperfluorododecyl or 2-cyanoethyl radicals. Particularly preferred radicals $R^4$ are the phenyl radical and the 3,3,3-trifluoropropyl radical.

Preferred radicals $R^5$ correspond to the general formula (4)

$$-(O)_s-(R^6)_t-(O)_u-(X)_w-(O)_u-(R^6)_t-(O)_s \qquad (4)$$

in which s, t, u and w, independently of one another, denote the values 0, 1 or 2, $R^6$ may be identical or different and denote a bivalent, optionally halogen-substituted hydrocarbon radical which optionally contains O, N, S or P atoms, is free of aliphatically unsaturated aliphatic groups and contains 1 to 10 carbon atoms, such as $-CH_2-$, $-CH_2-CH_2-$, $-CH_2-CH_2-CH_2-$, $-CF_2-$, $-CH_2-CF_2-$, $-CH_2-CH(CH_3)-$, $-C(CH_3)_2-$, $-CH_2-C(CH_3)_2-$, $-C(CH_3)_2-CH_2-$, $-CH_2-CH_2-O-$ or $-CF_2-CF_2-O-$, —(X)- denotes a bivalent radical which is selected from —Ph-, —Ph—O—Ph-, —Ph—S—Ph-, —Ph—$SO_2$—Ph-, —Ph—$C(CH_3)_2$—Ph-, —Ph—$C(CF_3)_2$—Ph-, —Ph—C (O)—Ph-, cyclohexylene or norbornylene, —Ph- designating a phenylene group. It is preferable that s and u be 0 or 1. A particularly preferred radical $R^5$ is the phenylene radical.

The organohydrogenpolysiloxane (B) preferably contains 5 to 50 SiH groups, in particular 8 to 25 SiH groups, per molecule. The viscosity of component (B), measured at 25° C., is preferably 2 mPa·s to 1 Pa·s. Owing to the labile nature of the SiH group, the component (B) may have a low content, typically<100 ppm by weight, of Si-bonded OH groups, arising, for example, from its preparation.

At least one of the radicals $R^7$, $R^8$ and $R^9$ in compound (C) is aliphatically unsaturated and amenable to a hydrosilylation reaction. Examples of aliphatically unsaturated radicals (a) are alkenyl and alkynyl radicals such as vinyl, allyl, isopropenyl, 3-butenyl, 2,4-pentadienyl, butadienyl, 5-hexenyl, undecenyl, ethynyl, propynyl and hexynyl radicals; cycloalkenyl radicals such as cyclopentenyl, cyclohexenyl, 3-cyclohexenylethyl, 5-bicycloheptenyl, norbornenyl, 4-cyclooctenyl or cyclooctadienyl radicals; alkenylaryl radicals such as styryl or styrylethyl radicals, and also halogenated and heteroatom-containing derivatives of the aforementioned radicals, such as vinyloxy, allyloxy, 5-hexenyloxy, 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, adryloyl, acryloyloxy, methacryloyl or methacryloyloxy radicals. Preferred aliphatically unsaturated radicals are vinyloxy, allyloxy and 5-hexenyloxy radicals, especially the allyloxy radical.

Examples of aliphatically saturated hydrocarbon radicals $R^7$, $R^8$ or $R^9$ (b) are alkyl radicals such as methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as cyclopentyl, cyclohexyl, cycloheptyl, norbornyl, adamantylethyl or bornyl radical; aryl or alkaryl radicals such as phenyl, ethylphenyl, tolyl, xylyl, mesityl or naphthyl radicals; aralkyl radicals such as benzyl, 2-phenylpropyl or phenylethyl radicals, and also halogenated or heteroatom-containing derivatives, or derivatives of the aforementioned radicals functionalized with organic groups. Preferred radicals contain 1 to 10 carbon atoms and also, if desired, halogen substituents. Preferred aliphatically saturated radicals are methyl, ethyl, propyl, and butyl radicals. The methyl radical is a particularly preferred radical.

Examples of the radical $R^8$, furthermore, are hydrogen, or an aliphatically unsaturated or aliphatically saturated radical as defined above. A preferred radical $R^8$ is hydrogen.

In the general formula (3), g is preferably 1, i.e., compound (C) is a keto ester. A particularly preferred compound (C) is allyl acetoacetate.

The radicals $R^1$ to $R^9$ in all above formulae may be identical or different. Preferred heteroatoms are N, O and S. Preferred halogen substituents are F, Cl and Br.

Preferably 0.1 to 50 parts by weight, more preferably 0.5 to 10 parts by weight of organohydrogenpolysiloxane (B), and 0.1 to 10 parts by weight, more preferably 0.3 to 3 parts by weight of compound (C) are used per 100 parts by weight of diorganopolysiloxane (A).

The hydrosilylation catalyst (D) serves as a catalyst for the addition reaction, termed hydrosilylation, between the aliphatically unsaturated hydrocarbon radicals $R^2$ of the diorganopolysiloxanes (A) and the silicon-bonded hydrogen atoms of the organohydrogenpolysiloxanes (B). Numerous suitable hydrosilylation catalysts are described in the literature. In principle, all hydrosilylation catalysts corresponding to the prior art and used in addition-crosslinking silicone rubber materials can be used.

Metals and their compounds such as platinum, rhodium, palladium, ruthenium and iridium, preferably platinum, can be used as hydrosilylation catalysts (D). The metals can optionally be fixed on finely divided support materials, such as active carbon, metal oxides, such as alumina, or silica.

Platinum and platinum compounds are preferably used. Particularly preferred platinum compounds are those which are soluble in polyorganosiloxanes. The soluble platinum compounds used may be, for example, the platinum-olefin complexes of the formulae $(PtCl_2 \cdot olefin)_2$ and $H(PtCl_3 \cdot olefin)$, with preference given to alkenes having 2 to 8 carbon atoms, such as ethylene, propylene, isomers of butene and of octene, or cycloalkanes having 5 to 7 carbon atoms, such as cyclopentene, cyclohexene and cycloheptene. Additional soluble platinum catalysts are the platinum-cyclopropane complexes of the formula $(PtCl_2C_3H_6)_2$, the reaction products of hexachloroplatinic acid with alcohols, ethers and aldehydes and mixtures thereof, or the reaction product of hexachloroplatinic acid with methylvinylcyclotetrasiloxane in the presence of sodium bicarbonate in ethanolic solution. Platinum catalysts with phosphorous, sulfur and amine ligands may also be used, e.g. $(Ph_3P)_2PtCl_2$. Complexes of platinum with vinylsiloxanes, such as symdivinyltetramethyldisiloxane, are particularly preferred.

The amount of hydrosilylation catalyst (D) used depends on the desired crosslinking rate and economic considerations. Preferably $1 \times 10^{-5}$ to $5 \times 10^{-2}$ parts by weight, in particular $1 \times 10^{-3}$ to $1 \times 10^{-3}$ parts by weight of platinum catalysts, calculated as platinum metal, are used per 100 parts by weight of diorganopolysiloxanes (A).

The self-adhesive addition-crosslinking silicone compositions can optionally contain further components (E), such as fillers, inhibitors, stabilizers, pigments and catalysts. For the buildup of cohesive adhesion on aluminum and steel substrates, the further addition of organotitanium or organozirconium compounds such as titanium tetrabutylate or zirconium tetrabutylate, for example, is particularly preferred.

In order to achieve sufficiently high mechanical strength of the crosslinked silicone rubber, it is preferable to incorporate actively reinforcing fillers as component (F) into the addition-crosslinking silicone compositions. The actively reinforcing fillers (F) used are in particular precipitated and pyrogenic silicas, and mixtures thereof. The specific surface area of these actively reinforcing fillers should be at least 50 $m^2/g$, and preferably in the range from 100 to 400 $m^2/g$ determined according to the BET method. Such actively reinforcing fillers are very well known materials in the area of silicone rubbers.

The compounding of the self-adhesive addition-crosslinking silicone compositions is effected by mixing the abovementioned ingredients in any desired sequence. The crosslinking of the self-adhesive addition-crosslinking silicone compositions is preferably effected by heating, preferably at 30° C. to 250° C., preferably between 50° C. and 80° C.

The invention also relates to the addition-crosslinked silicone elastomers prepared from the crosslinkable compositions. The silicone compositions can be bonded to a substrate by applying the silicone compositions to the substrate and then crosslinking them, preferably by heating to 30 to 250° C., to give a composite material.

The self-adhesive addition-crosslinking silicone composition can advantageously be used, in particular, where good adhesive strength between the addition-crosslinked silicone elastomer and a substrate, preferably consisting of organic plastics, ie id metals or glasses is desired and the vulcanizing temperature is limited to temperatures of not more than 100° C., in particular not more than 80° C. The substrate may be present as a shaped article, film or coating.

The self-adhesive addition-crosslinking silicone compositions are suitable for the production of composite materials by coating, adhesive bonding or casting and for the production of shaped articles. The self-adhesive addition-crosslinking silicone compositions are particularly suitable for casting and for adhesively bonding electrical and electronic parts and for the production of composite shaped articles. Composite shaped articles are understood here as meaning a uniform shaped article comprising a composite material which is composed of a silicone elastomer part produced from the silicone compositions and at least one substrate, so that there is a strong, permanent bond between the two parts. Such a composite shaped article is preferably produced by processing an organic plastic to give a shaped article and then bringing the silicone compositions into contact with this shaped article and crosslinking them, which can be effected, for example, by the injection molding method, by means of extrusion and in the so-called press-molding method. Composite materials and in particular composite shaped articles can be used in a very wide range of applications, for example in the electronics, household appliances, consumables, construction and automotive industry, in medical technology, in the production of sport and leisure articles, etc.

In the following examples, unless stated otherwise in each case, all pressures are 0.10 MPa (abs.), and all temperatures are 20° C.

EXAMPLES

Substrates

The adhesion of the addition-crosslinked silicone elastomers according to the invention and comparative elastomers not according to the invention was tested on the following substrates:

a) polybutylene terephthalate (PBT): Ultradur® B4300G6 (BASF AG; 30% GF)

b) polyamide 6 (PA6): Durethan® BKV30 (Bayer AG; 30% GF)

c) polyamide 66 (PA66): Durethan AKV30®(Bayer AG; 30% GF)

d) aluminum (industrial quality; not primed)

e) steel: VA stainless steel (industrial quality)

Characterization of Adhesion (Examples 3–10)

To characterize the adhesive strength, 100.0 g of an addition-crosslinking liquid silicone elastomer material free of SiH crosslinking agent, containing 71.6% by weight of diorganopolysiloxane having a viscosity of 20,000 mPa·s and 28.4% by weight of a reinforcing filler, available from Wacker—Chemie GmbH under the name ELASTOSIL® LR 3003/40 A, are thoroughly mixed with the amounts specified in Table 1 of the crosslinkers prepared in accordance with subsequent examples, and, if desired, further adhesion-promoting additives. The mixtures are then degassed in vacuo at room temperature. The results of the adhesion measurements are reported in Table 2.

A substrate strip with the dimensions 60×20×2 mm is introduced into a stainless steel compression mold and the mold is filled with the addition- crosslinking silicone elastomer material to be tested. Vulcanization under atmospheric pressure is carried out at a temperature of 80° C. for 60 minutes. After removal of the laminate, the rigid substrate element is firmly clamped and the maximum parting force required to detach the adhering silicone elastomer strip is measured by the peel test. The parting force is determined in accordance with DIN 53531 and is reported in N/mm. 5 laminates are measured per example, the maximum parting force is determined as a mean value and the proportion of cohesive failure is determined as a percentage. A cohesive failure of 0 % means that the silicone elastomer was detached from the substrate surface completely and without leaving a residue. A cohesive failure of 100% means that the delamination took place exclusively by crack growth within the silicone elastomer.

Example 1

5.0 kg of a methylhydrogenpolysiloxane, $Me_3Si$—(—O—SiH(Me))$_n$—O- $SiMe_3$, which has terminal trimethylsiloxy groups and, according to $^{29}Si$—NMR, has a number average chain length of n=53, and 5.0 kg of a siloxane copolymer having terminal trimethylsiloxy groups and consisting of dimethylsiloxy and methylphenylsiloxy units in a molar ratio of 15.2:21.8 and having a viscosity, measured at 25° C., of 100 mPa·s, are initially introduced into a stirrer. 1.8 g of phosphonitrilic chloride, prepared according to U.S. Pat. No. 4,203,913, are added at room temperature with continuous stirring. After application of a vacuum of<20 mbar, stirring is maintained for 5 min and the vacuum is then broken with $N_2$. Stirring is then carried out for 2 h at a temperature of 100° C. 14 g of hexamethyl-disilazane are then added and stirring is carried out for a further 15 min. Finally, a vacuum of<10 mbar is applied, the mixture is freed from volatile components with continuous stirring for 1 h at 100° C., the vacuum is broken with $N_2$, the mixture is cooled to room temperature, and the reaction product is filtered. A poly-organosiloxane which has terminal trimethylsilyloxy groups and is composed of —O—Si(Me)$_2$-, —O—SiH(Me)- and —O—Si(Me)Ph- units in a molar ratio of 15.2:63.0:21.8, having a viscosity of 32.1 mm$^2$/s at 25° C., is obtained. The product contains on average 17 Si—H groups per molecule. The product, a crosslinker in accordance with the subject invention, is designated "crosslinker 1".

Comparative Example C1

Instead of the phenyl-containing crosslinking agent described in Example 1, a polyorganosiloxane which has terminal trimethylsilyloxy groups, contains only —O—Si(Me)$_2$- and —O—SiH(Me)- units in a molar ratio of 29:71 and has a viscosity of 30 mm$^2$/s at 25° C. is used; this crosslinking agent contains on average 33 Si—H groups per molecule, is not in accordance with the invention, and is designated "crosslinker C1".

Examples 2–5 and Comparative Examples

The crosslinker (B), adhesion promoter (C) and additional ingredients of elastomer compositions are set forth below in Table 1. The amount of SiH crosslinker used ensures that the addition-crosslinking silicone elastomer materials prepared in accordance with Examples 1 and 2 contain the same amount of Si-bonded hydrogen. The respective results of the adhesion test measurements are reported in Table 2.

TABLE 1

Composition of Examples 2–5 and C2–C6

| Example | Cross-linker 1 [g] | Cross-linker C1 [g] | Allyl aceto-acetate [g] | Titanium tetrabutylate [g] | Glycidyl-oxypropyl-trimethoxysilane [g] |
|---|---|---|---|---|---|
| C2 | 1.5 | — | — | — | — |
| C3 | — | 1 | — | — | — |
| 2 | 1.5 | — | 0.3 | — | — |
| 3 | 1.5 | — | 0.5 | — | — |
| C4 | — | 1 | 0.5 | — | — |
| 4 | 1.5 | — | 0.5 | 0.1 | — |
| 5 | 1.5 | — | 0.5 | 0.3 | — |
| C5 | 1.5 | — | — | — | 0.5 |
| C6 | — | 1 | — | — | 0.5 |

TABLE 2

Tear force on substrate in [N/mm]; fraction of cohesive failure in [%]

| Example | PBT [N/mm]/ [%] | PA6 [N/mm]/ [%] | PA66 [N/mm]/ [%] | Steel [N/mm]/ [%] | Aluminum [N/mm]/ [%] |
|---|---|---|---|---|---|
| C2 | 1.5/0 | 3.3/0 | 2.5/0 | 1.4/0 | 1.8/0 |
| C3 | 0.3/0 | 0.8/0 | 1.0/0 | 0.3/0 | 0.5/0 |
| 2 | 9.5/40 | 10.1/50 | 8.9/30 | 3.2/0 | 1.2/0 |
| 3 | 8.6/80 | 12.7/80 | 9.9/90 | 4.1/0 | 1.5/0 |
| C4 | 0.5/0 | 4.7/0 | 3.9/0 | 1.1/0 | 0.4/0 |
| 4 | 13.5/100 | 11.1/80 | 8.7/80 | 5.5/0 | 5.4/0 |
| 5 | 10.4/100 | 10.0/70 | 6.8/70 | 5.8/30 | 7.3/30 |
| C5 | 2.7/0 | 6.0/0 | 3.7/0 | 2.5/0 | 1.4/0 |
| C6 | 0.4/0 | 1.0/0 | 0.6/0 | 1.1/0 | 0.3/0 |

The values shown in Table 2 demonstrate the high adhesive strength between the addition-crosslinked silicone elastomer according to the invention (Examples 2, 3, 4 and 5) and various organic plastics and metals. As is evident from Comparative Example C4, a high adhesive strength is not achieved by the presence of component (C) alone (for example, allyl acetoacetate) but only when this component is used in conjunction with component (B). As is evident from Comparative Example C2, a high adhesive strength is achieved not by the presence of the component (B) alone, but only in conjunction with a component (C), according to the invention (Examples 2, 3). This is evidence of a synergistic effect of the adhesion-promoting components (B) and (C) of the silicone elastomer material according to the invention.

Furthermore, it is demonstrated by Comparative Examples C5 and C6 that significantly higher parting forces are achieved with the constituent (C) of the invention than with the most common adhesion promoter, glycidyloxypropyl-trimethoxysilane.

Examples 4 and 5 show the additional adhesion-promoting effect of constituent (E) of the invention when using inorganic substrates such as steel and aluminum.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self-adhesive addition-crosslinking silicone composition comprising:

(A) a diorganopolysiloxane of the general formula (1)

$$R^1{}_a R^2{}_b SiO_{(4-a-b)/2} \tag{1}$$

in which $R^1$ is a hydroxyl radical or a monovalent, optionally halogen-substituted $C_{1-20}$ hydrocarbon radical free of aliphatically unsaturated groups, optionally containing O, N, S or P atoms, $R^2$ is a monovalent, aliphatically unsaturated, optionally halogen-substituted $C_{2-10}$ hydrocarbon radical optionally containing O, N, S or P atoms, b has a value of from 0.003 to 2, with the proviso that $1.5<(a+b)<3.0$, that on average at least two aliphatically unsaturated radicals $R^2$ are present on average per molecule, and that the viscosity of the diorganopolysiloxanes (A), determined at 25° C., is 1 mPa·s to 40,000 Pa·s;

(B) an organohydrogenpolysiloxane of the general formula (2)

$$R^3{}_c R^4{}_d R^5{}_e H_f SiO_{(4-c-d-2e-f)/2} \tag{2},$$

in which $R^3$ is a monovalent aliphatically saturated $C_{1-20}$ hydrocarbon radical, $R^4$ is (a) an optionally halogen-substituted monovalent $C_{6-15}$ hydrocarbon radical which contains at least one aromatic $C_6$-ring, or (b) a halogen-substituted, saturated monovalent $C_{2-20}$ hydrocarbon radical optionally containing O, N, S or P atoms, $R^5$ is a bivalent, optionally halogen-substituted $C_{6-20}$ hydrocarbon radical Si-bonded at both ends, optionally containing O, N, S or P atoms, c, d, e and f denote positive numbers, with the proviso that the relationship: $0.05<100\,(d+e)/(c+d+e+f)<12$ is fulfilled and that the viscosity of the organohydrogenpolysiloxane (B), determined at 25° C., is 1 mPa·s to 100 Pa·s;

(C) a compound containing at least one aliphatically unsaturated radical and at least one β-diketone or β-keto ester group, of the general formula (3):

$$R^7\!\!-\!\!CO\!\!-\!\!CHR^8\!\!-\!\!CO\!\!-\!\!(O)_g\!\!-\!\!R^9 \tag{3},$$

where $R^7$ and $R^9$ are each an identical or different (a) monovalent, aliphatically unsaturated, optionally halogen-substituted $C_{2-12}$ hydrocarbon radical optionally containing O, N, S or P atoms, or (b) a monovalent aliphatically saturated $C_{1-20}$ hydrocarbon radical, $R^8$ is hydrogen, (a) a monovalent, aliphatically unsaturated, optionally halogen-substituted $C_{2-12}$ hydrocarbon radical optionally containing O, N, S or P atoms, or (b) a monovalent aliphatically saturated $C_{1-20}$ hydrocarbon radical, g is 0 or 1; and (D) a hydrosilylation catalyst.

2. The self-adhesive addition-crosslinking silicone composition as claimed in claim 1, in which the viscosity of component (B), measured at 25° C., is 2 mPa·s to 1 Pa·s.

3. The silicone composition of claim 1 wherein $R^4$ is phenyl.

4. The silicone composition of claim 1 wherein component (C) is allylacetoacetate.

5. The silicone composition of claim 3 wherein component (C) is allylacetoacetate.

6. The silicone composition of claim 1 further comprising an organotitanium compound, an organozirconium compound, or mixture thereof.

7. The silicone composition of claim 1 further comprising at least one of titanium tetrabutylate or zirconium tetrabutylate.

8. A process for the preparation of self-adhesive addition-crosslinked silicone elastomers, comprising curing the self-adhesive addition-crosslinking silicone compositions of claim 1 at a temperature of 30 to 250° C.

9. A process for the preparation of self-adhesive addition-crosslinked silicone elastomers, comprising curing the self-adhesive addition-crosslinking silicone compositions of claim 2 at a temperature of 30 to 250° C.

10. A process for the preparation of self-adhesive addition-crosslinked silicone elastomers, comprising curing the self-adhesive addition-crosslinking silicone compositions of claim 3 at a temperature of 30 to 250° C.

11. A process for the preparation of self-adhesive addition-crosslinked silicone elastomers, comprising curing the self-adhesive addition-crosslinking silicone compositions of claim 4 at a temperature of 30 to 250° C.

12. A self-adhesive addition-crosslinked silicone elastomer prepared by the process of claim 8.

13. A process for adhesively bonding an addition-crosslinking silicone composition to a substrate, comprising applying the self-adhesive addition-crosslinking silicone compositions of claim 1 to the substrate and crosslinking by heating to 30 to 250° C.

14. A process for adhesively bonding an addition-crosslinking silicone composition to a substrate, comprising applying the self-adhesive addition-crosslinking silicone compositions of claim 2 to the substrate and crosslinking by heating to 30° C. to 250° C.

15. A process for adhesively bonding an addition-crosslinking silicone composition to a substrate, comprising applying the self-adhesive addition-crosslinking silicone compositions of claim 3 to the substrate and crosslinking by heating to 30° C. to 250° C.

16. A process for adhesively bonding an addition-crosslinking silicone composition to a substrate, comprising applying the self-adhesive addition-crosslinking silicone compositions of claim 4 to the substrate and crosslinking by heating to 30° C. to 250° C.

17. A process for adhesively bonding an addition-crosslinking silicone composition to a substrate, comprising applying the self-adhesive addition-crosslinking silicone compositions of claim 6 to the substrate and crosslinking by heating to 30° C. to 250° C.

18. A composite material prepared by the process of claim 13.

\* \* \* \* \*